(No Model.) 2 Sheets—Sheet 1.

E. BEGHTEL.
PORTABLE SAWING MACHINE.

No. 374,573. Patented Dec. 13, 1887.

Witnesses:
J. B. McGirr.
H. L. Boyden

Inventor:
Eli Beghtel.
By his Atty.
Chas. E. Barber.

(No Model.) 2 Sheets—Sheet 2.

E. BEGHTEL.
PORTABLE SAWING MACHINE.

No. 374,573. Patented Dec. 13, 1887.

Witnesses
Edwin T. Yewell,
H. L. Boyden

Eli Beghtel
Inventor

By His Attorney in fact
Chas. A. Barber

UNITED STATES PATENT OFFICE.

ELI BEGHTEL, OF HUNTINGTON, INDIANA.

PORTABLE SAWING-MACHINE.

SPECIFICATION forming part of Letters Patent No. 374,573, dated December 13, 1887.

Application filed June 14, 1887. Serial No. 241,285. (No model.)

*To all whom it may concern:*

Be it known that I, ELI BEGHTEL, a citizen of the United States, residing at Huntington, in the county of Huntington and State of Indiana, have invented certain new and useful Improvements in Portable Circular Sawing Machines, of which the following is so full, clear, and exact a description as will enable others skilled in the art to which my invention appertains to make and use the same, reference being had to the accompanying drawings.

This invention relates to an improvement in portable circular sawing machines; and it consists in the construction, arrangement, and combination of parts, substantially as will be hereinafter described, and then more particularly pointed out in the appended claims.

Figure 1:
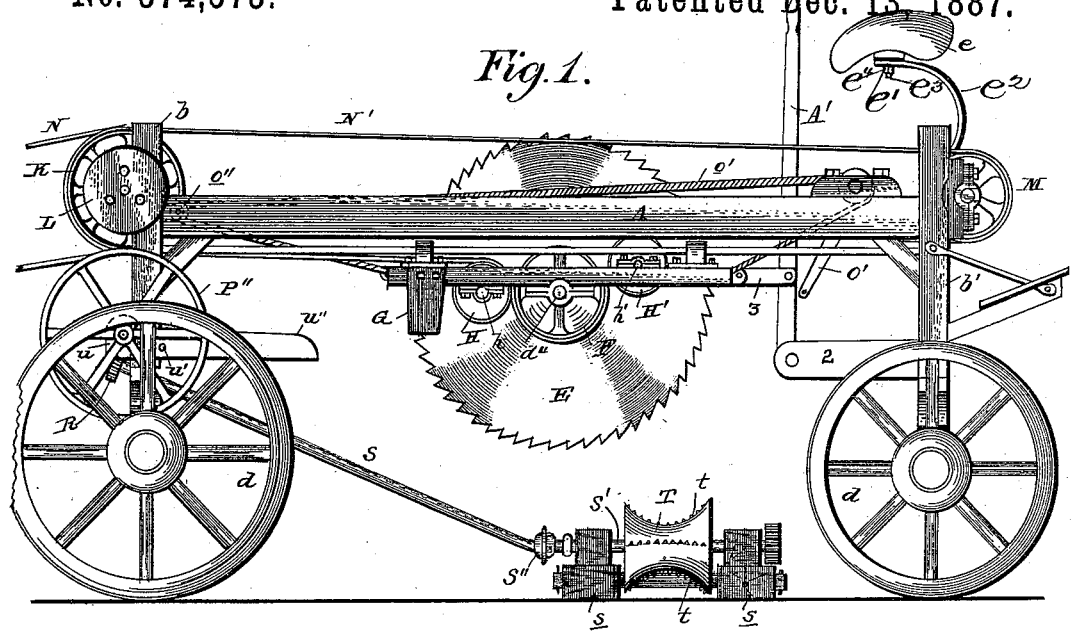
Figure 2:
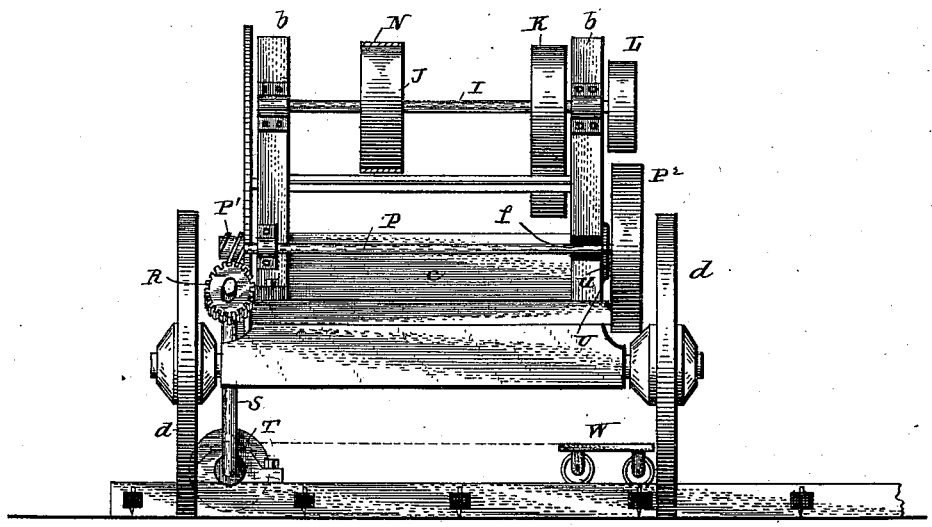
Figure 5:
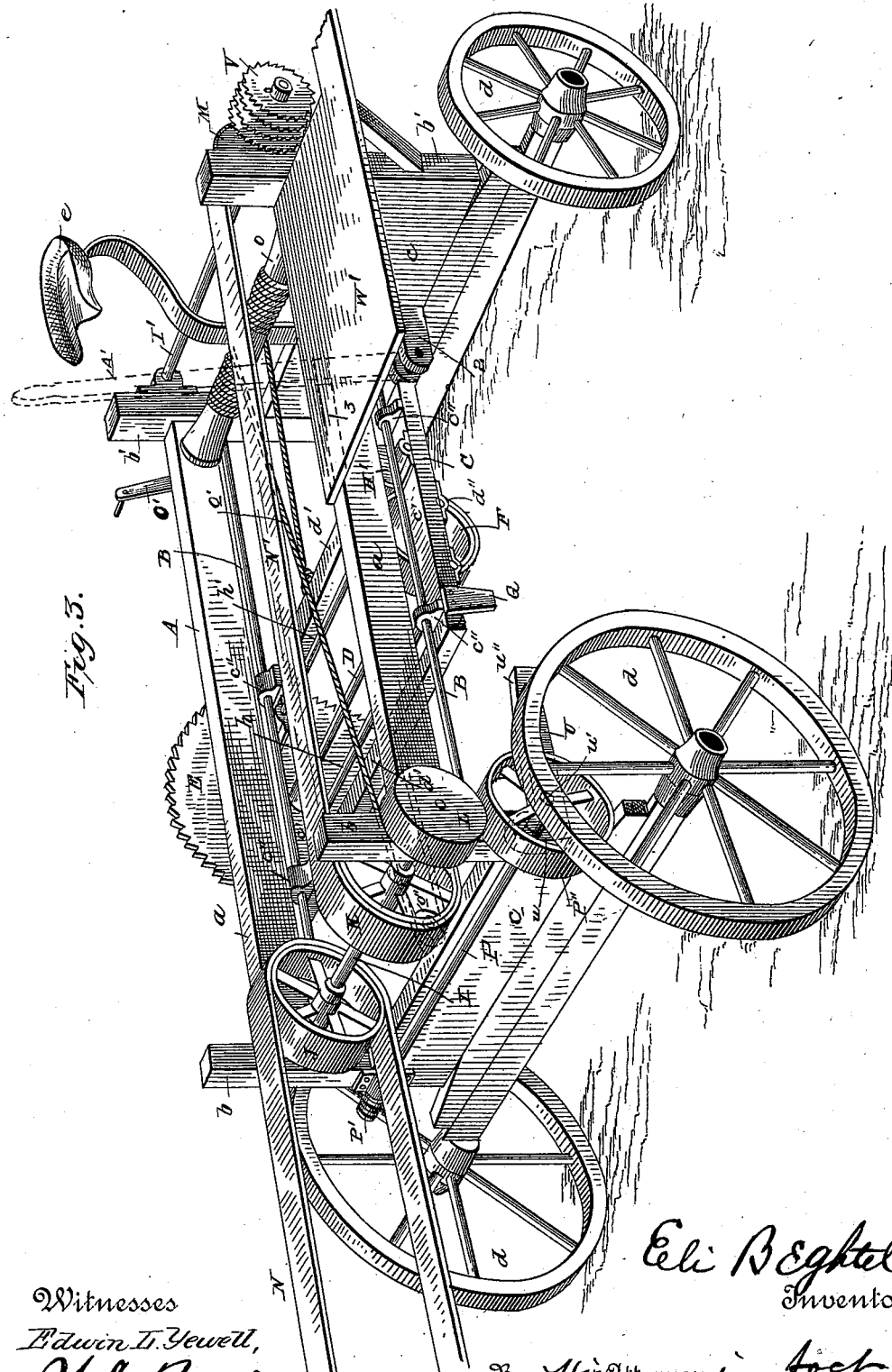

In the annexed drawings, illustrating my invention, Figure 1 is a side elevation of my improved sawing-machine, showing beneath the same the log-feeding device. Fig. 2 is a rear end elevation of the same. Fig. 3 is a perspective.

Like letters of reference denote corresponding parts throughout the several views.

The object of my invention is to construct a portable sawing-machine which can be easily moved from place to place, and which can be used as a crosscut-saw for sawing wood and other timbers, or for sawing timbers which have been previously sawed or which are to be afterward sawed up into pieces of any desired length.

Another object of my invention is to construct a portable sawing-machine which may be used as a crosscut-saw or as a slitting-saw to saw timber lengthwise the log or to saw plank of any desired thickness.

Another object of my invention is to construct a portable sawing-machine which may be taken to any part of the woods or adjoining locality, in order to enable me to saw boards, planks, and slabs, and to convert the same into fence-pickets or railroad-ties without the necessity of taking them to a regular saw-mill while in a crude state in the log.

Another object of my invention is to construct an automatic feeding device which will feed the logs through the medium of the same running-power and running mechanism which run the saw proper.

Another object of my invention is to construct a portable sawing-machine and provide the same with mechanism for quickly and easily sliding the saw backward and forward to cut small pieces without any great expense of physical force.

A designates the supporting-frame of my improved sawing-machine, which is preferably composed of two longitudinal beams or timbers, $a\ a$, secured to the upright corner-posts $b\ b$ and $b'\ b'$, situated at the front and rear ends of the machine, respectively, which corner-posts are connected with each other by the transverse beams or girders $c\ c$, thus completing the frame. This frame is suitably mounted upon wheels $d\ d$, as shown, so as to allow it to be moved from place to place, and to it is attached in any desirable manner a seat, $e$, for the driver or operator. Running longitudinally of this frame A, and secured to the corner-posts $b\ b'\ b\ b'$, are rods or tracks B B, situated one on each side of the same, and preferably a short distance below the beams or timbers $a\ a$. Upon these rods or tracks B is adapted to be run, in the manner to be hereinafter described, a saw-carrying frame, C, which frame C is preferably rectangular in form, and is composed of the longitudinal bars $c'\ c'$ and cross-pieces $d'\ d'$. This frame C is adapted to be run or slid upon the rods or tracks B by means of ears $c^2\ c^2\ c^2\ c^2$, secured to the said frame and provided with a central perforation for the reception of the said rods B. Journaled in suitable bearings, as $d^2$, within this sliding saw-carrying frame C is a saw-arbor, D, which carries at one end the ordinary circular saw, E, and at the opposite end a driving-pulley, F, and on each side of this saw-arbor is a shaft, $h\ h'$, likewise journaled in suitable bearings, secured to the sliding frame C, which carry at one end idler-pulleys H and H', respectively, one of which shafts, as $h$, having its bearings secured to the under side of the bar $c'$, and the other of which, as $h'$, has its bearing secured to the upper side of said bar $c'$, as shown best in Fig. 1.

Secured near the rear end of the sliding frame C, and on the same side as the driving-pulley F, is a downwardly-projecting foot, G, the object of which will be hereinafter described.

I represents a transverse shaft, suitably journaled at or near the rear of the machine and carrying pulleys J, K, and L, and I' represents another shaft, suitably journaled at or near the front of the machine and carrying pulley M. The shaft I is connected with an engine or other suitable driving-power, (not shown,) from which it receives motion by means of an endless belt, as N, passing from said engine to and around the pulley J, and the pulleys K, F, and M are connected with each other by an endless belt, as N', which belt (see Fig. 1) passes under the pulley k, over the idler-pulley H, (journaled on the under side of the sliding frame C,) under the driving-pulley F, over the idler-pulley H', (journaled on the upper side of the sliding frame C,) to and around the pulley M, situated at the front of the machine, and from thence back to the pulley K. This arrangement of idler-pulleys, journaled, respectively, to the bottom and top of the sliding frame, and of the manner of arranging the belt thereupon, possesses great advantage, as, obviously, it insures the running of the pulley F always upon the tight portion of said belt, thus revolving in a better manner the saw-arbor D.

When motion is imparted to the pulley J by means of the belt N running from the engine to said pulley, it will revolve the shaft I, and consequently the pulley K, which will revolve the saw-arbor, and thereby the saw, by means of the belt-connection, just described.

The sliding of the saw-carrying frame C upon the rods or tracks B is usually accomplished in the following manner: Near the front of the machine is suitably journaled a windlass, O, operated by a crank, O'. A rope, $o'$, is wrapped around this windlass, one end being run to and around a small pulley, $o^2$, secured, preferably, to a movable bar at or near the rear end of the machine, and from thence runs to and is secured to the rear end of the sliding frame C, while the other end of this rope is secured to the front of the sliding frame, and passes from thence directly to the windlass, being wrapped around it in a direction the reverse of the first end. Obviously, by this arrangement of the rope, when the crank is turned in a certain direction, the sliding saw-carrying frame will be gigged back, and when the crank is turned in the opposite direction the movement of the saw-carrying frame will be the reverse, thus moving the saw up to and away from the log of wood being operated upon.

In some instances it becomes desirable to provide mechanism whereby the log of wood may be fed forward automatically. In order to accomplish this result, I journal beneath the shaft I, and parallel therewith, another shaft, P, having at one end a worm, P', and at the other end a friction-pulley, $P^2$. The worm P' meshes with a gear, R, situated on the end of a rod or shaft, S, which rod or shaft is connected with and actuates a horizontal shaft, S', by means of a universal joint, $S^2$.

This horizontal shaft S' is supported by any suitable frame-work, as $s$, and is journaled in suitable bearings therein, and carries a device, T, (see Fig. 1,) preferably, although not necessarily, made in the form of a roller having a concave surface and provided with series of teeth. The object of this device is to automatically feed forward the log, and it accomplishes its object in the following manner: The lower friction-pulley, $P^2$, is normally out of contact with the upper friction-pulley, L, and is elevated by means of a lever, as U, having, preferably, an enlarged end, as $u$, provided with a perforation and adapted to inclose the end of the shaft P, forming a box or bearing therefor. This lever is pivoted, as at $u'$, to one of the posts $b$, and has its outer end cut away, as at $u^2$. Obviously, when the sliding frame C is gigged back in the manner hereinbefore described, the foot G, secured thereto, will ride upon the cut-away portion $u^2$ of the lever U and depress it, thus elevating the pulley $P^2$ and bringing it into frictional contact with the pulley L, the post $b$, having a cut-out portion, as $f$, allowing the end of the shaft to have a free range of movement. The seat $e$ is pivoted at $e'$, and is secured to the curved spring $e^2$ by a bolt, $e^3$, which extends down through the spring, and is secured in place by a nut, $e^4$, all of which is clearly shown in Fig. 1.

From the foregoing description the operation of my machine in cutting a log will be readily comprehended. Motion being imparted to the pulley J by the belt N, which belt is connected with any suitable engine or motive power, will revolve the shaft I, and consequently the pulleys K and L, which will, by means of the belt-connection previously described, rotate the saw-arbor D, and consequently the saw, E, carried thereby. The log is next placed so that its end will rest upon the feeding-roller T, its outer end being supported by some suitable device, such as the carriage W. The sliding saw-carrying frame C is next gigged back by means of the crank O', and the foot G, secured thereto, will ride upon the cut-away portion $u^2$ of the lever U, depressing this end of said lever and elevating the pulley $P^2$ into frictional contact with pulley L, thus rotating the shaft P, and the worm P', meshing with the gear R, will transmit motion to the rod or shaft S, and this rod or shaft will, by means of the universal joint $S^2$, rotate the shaft S', carrying the log-feeding roller T, which roller feeds forward the log by means of its series of teeth. When the log has been fed forward far enough, the crank O' is turned in the opposite direction, which reverses the movement of the saw-carrying frame C, thus carrying the foot G off of the lever U and allowing the pulley $P^2$ on the other end of said lever to drop down out of contact with pulley L, thus stopping the rotation of shaft P, and consequently of the feeding-roller T, which feeding-roller will obviously now act as a dog to hold the log while being cut. The crank O' is rotated until the saw has been moved up to and through the log, where it is reversed and the operation continued as before.

In order to cut boards, planks, &c., into suitable sizes for laths, fence-pickets, &c., I have extended the shaft T out beyond one side of the machine, and have mounted upon said extended portion, in any desirable manner, a series of saws, as V, composed of any desired number of saws, the saws of which are situated, preferably, at different distances apart for the purpose of cutting the material into different widths; but obviously they may be placed the same distance apart, if desired. The material to be cut is fed forward to this series of saws upon the bench or table W'.

In cutting thin logs of wood—such as saplings,&c.—it is not always necessary or desirable to feed the log forward by means of the feeding device T; neither is it always desirable to slide the frame C by means of the windlass and rope. I therefore provide for the purpose of advancing and retracting the sliding frame a lever, A', (the ropes having been detached from the said frame,) which lever is preferably situated at or near the operator's seat on the front of the machine, is fulcrumed on a suitable base, as 2, and is connected with the sliding frame C by means of a rod, 3, projecting at right angles from the said lever and secured to the front of the sliding frame. The working back and forth of this lever A' will slide the frame C back and forth. The log may be fed to the saw in any convenient manner. The log may be shoved under the saw at right angles to the plane of the sides of the latter, or the bed-frame may be turned one-quarter round and the log run under the saw parallel with the lines of the sides of the saw to cut the logs into parts or square timbers, all of which will be readily understood and appreciated by those skilled in the art.

Having now described the objects, uses, and construction of my invention, what I desire to secure by Letters Patent, and what I therefore claim, is—

1. In a portable sawing-machine, the combination, with a traveling saw, of a feeding device mounted upon a shaft and consisting of a roller provided with a series of teeth, and means for rotating said feeding device, consisting of a rod having at one extremity a pinion meshing with a worm upon the end of a transverse shaft, P, and at its other extremity a universal joint for connection with the shaft of the log-feeding device, and the shaft P having at its other extremity a friction-pulley and means for elevating the said pulley into contact with a pulley above it, consisting of a pivoted lever having its outer end inclined and a foot mounted upon a traveling saw-carrying frame and adapted to ride upon the said lever, and means for driving the upper pulley, consisting of a belt connecting with an engine or other suitable driving-power, substantially as shown and described.

2. In a portable sawing-machine, the sliding frame and saw, said frame having a foot, G, in combination with a feeding-roller, T, provided with a series of teeth and mounted upon a shaft, and a rod connected with said shaft through a universal joint and provided with a gear meshing with a worm upon the end of a shaft having bearings in the supporting-frame, which shaft is provided on its opposite extremity with a pulley, and means for operating said shaft by elevating the pulley into frictional contact with a pulley above it, which means consists of a lever pivotally secured to the frame and adapted to receive the foot G upon its upper surface, and the driving mechanism for the saw-carriage and upper pulley, consisting of the pulleys K, F, and M, connected by an endless belt, and a pulley, J, connected with a suitable driving mechanism, substantially as shown and described.

3. In a portable sawing-machine, the main frame having suitable running mechanism and gearing and the sliding saw-carrying frame and saw E, in combination with a table and one or more saws situated in front of the said table and mounted upon a shaft having a pulley operated by the same gearing that rotates the said saw E, substantially as shown and described.

In testimony that I claim the above I hereunto set my hand in the presence of two witnesses.

ELI BEGHTEL.

Witnesses:
ZACHARIAH WALL,
SHERMAN SPRINKLE.